United States Patent [19]
Halter

[11] Patent Number: 5,295,216
[45] Date of Patent: Mar. 15, 1994

[54] FIBER OPTIC PANEL PROVIDING AN ARBITRARY PATTERN OF ILLUMINATION AND METHOD OF MAKING SAME

[75] Inventor: Roger F. Halter, Santa Ana, Calif.

[73] Assignee: Poly-Optical Products, Ltd., Irvine, Calif.

[21] Appl. No.: 977,484

[22] Filed: Nov. 17, 1992

[51] Int. Cl.$^5$ .............. G02B 6/00; F21V 7/04; G09F 13/18; B65H 69/02
[52] U.S. Cl. .................. 385/120; 385/115; 385/147; 385/901; 362/30; 362/31; 362/32; 40/546; 40/547; 156/158; 156/162; 156/163; 156/169; 156/173; 156/174
[58] Field of Search .............. 385/114, 115, 116, 120, 385/147, 901; 362/32, 30, 31; 40/546, 547; 156/157, 158, 160, 161, 162, 163, 164, 166, 169, 172, 173, 174, 181, 184

[56] References Cited

U.S. PATENT DOCUMENTS

| | | | |
|---|---|---|---|
| 3,104,191 | 9/1963 | Hicks, Jr. et al. | 385/116 X |
| 3,473,872 | 10/1969 | Okamura | 385/116 X |
| 3,586,562 | 6/1971 | Jones | 385/115 X |
| 4,113,348 | 9/1978 | Yevick | 385/116 X |
| 4,116,739 | 9/1978 | Glenn | 385/120 X |
| 4,172,631 | 10/1979 | Yevick | 385/115 X |
| 4,279,089 | 7/1981 | Murakami | 385/901 X |
| 4,597,030 | 6/1986 | Brody et al. | 385/115 X |
| 4,845,596 | 7/1989 | Mouissie | 362/32 |
| 4,929,048 | 5/1990 | Cuybers | 385/116 X |
| 5,021,928 | 6/1991 | Daniel | 385/901 X |
| 5,029,975 | 7/1991 | Pease | 385/120 X |
| 5,165,187 | 11/1992 | Shahidi-Hamedani et al. | 385/901 X |
| 5,187,765 | 2/1993 | Muehlemann et al. | 385/115 |
| 5,202,950 | 4/1993 | Arego et al. | 385/901 X |
| 5,226,105 | 7/1993 | Myers | 385/901 X |

OTHER PUBLICATIONS

"Polyglo 2", Drawing Number ME-13-00188, Poly-Optical Products, Inc., Santa Ana Calif. Aug. 21, 1992.

Primary Examiner—Brian Healy
Attorney, Agent, or Firm—Robbins, Berliner and Carson

[57] ABSTRACT

An improved fiber optic panel having a desired illumination pattern is assembled from at least two partial panels, each comprising a plurality of fully terminated parallel fibers. Two or more such partial arrays are combined to fabricate a optical fiber substrate having an arbitrary illumination pattern. The non-illuminated fiber lengths extending from the individual fiber terminations are removed before the two partial arrays are assembled, thus further enhancing the efficiency of the device. In a preferred embodiment the fibers of each partial array have a center-to-center spacing slightly greater than twice the fiber diameters, and the fibers of the two partial arrays are intermeshed to form a closely packed parallel array of fibers in which a fully terminated shorter fiber is located between two longer fibers.

10 Claims, 3 Drawing Sheets

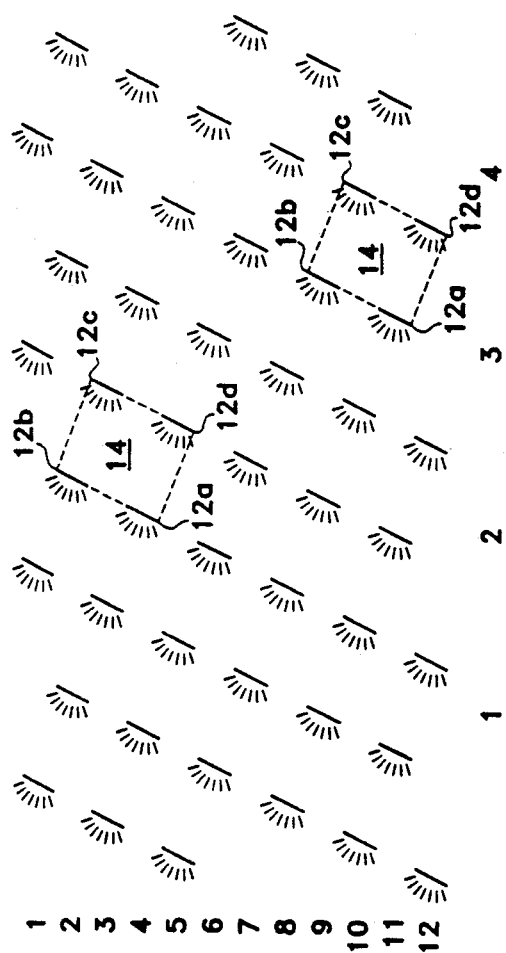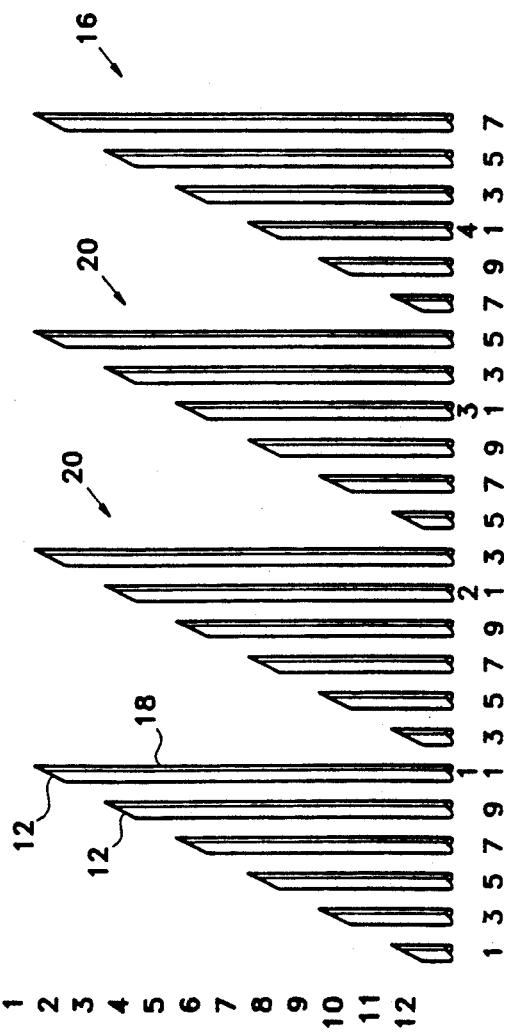
Fig. 1
Fig. 2

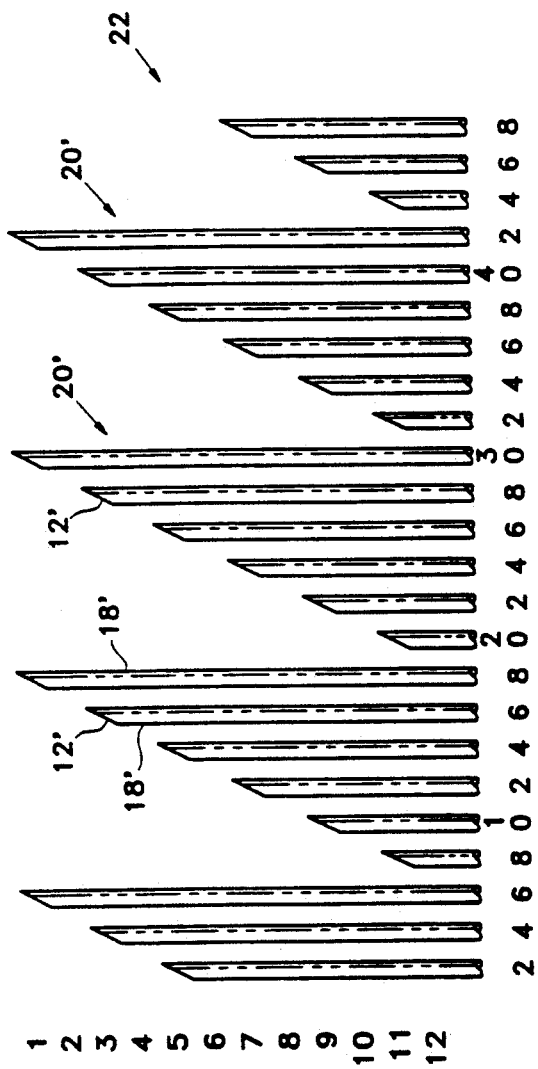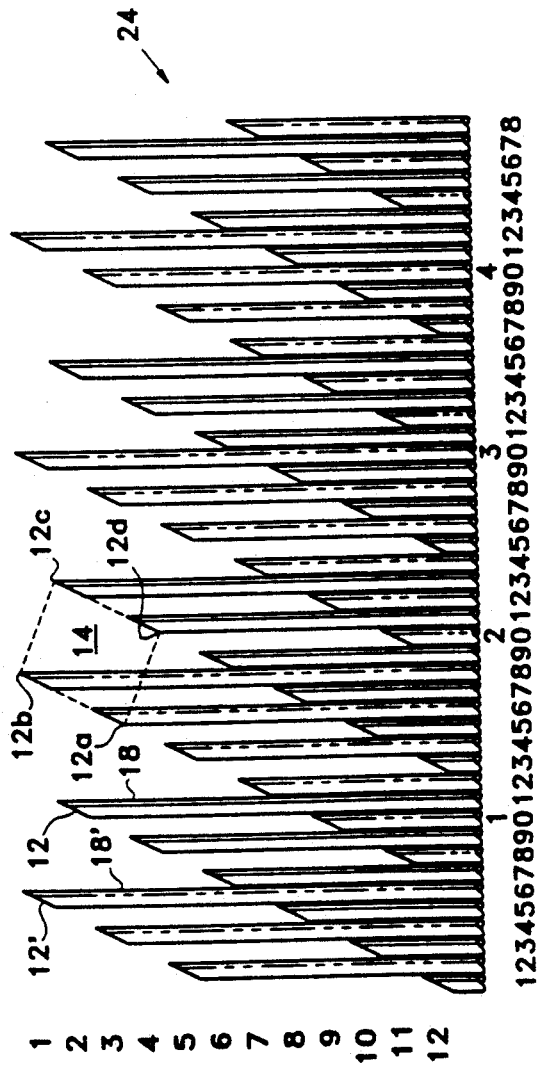

FIBER OPTIC PANEL PROVIDING AN ARBITRARY PATTERN OF ILLUMINATION AND METHOD OF MAKING SAME

FIELD OF THE INVENTION

The present invention relates generally to the illumination of liquid crystal displays and other backlit optical devices. More specifically, the present invention relates to an improved illumination panel using a parallel array of optical fibers to provide a predetermined background illumination, and to an improved method for making such a panel.

BACKGROUND OF THE INVENTION

Fiber optic backlighting panels are commonly used in flat panel liquid crystal displays and other selectively transmissive optical display devices, to display a high contrast image that is visible even under poor ambient light.

Typically, such prior backlighting devices utilize a single layer of optical fibers, each having a core surrounded by cladding, which are placed in intimate proximity to each other above an optically reflecting surface. Light is beamed into the optical fibers from a light source, such as a lamp. The light beamed in is propagated in the core of the optical conductor by means of partial internal refraction, and exits at one or more discontinuities in the fiber, providing local illumination in the region of the discontinuity. U.S. Pat. No. 4,845,596 to Mouissie discloses a manufacturing method for such a device whereby an outer sheath of the optical fiber is removed locally at various locations along the length of each fiber and a portion of the light beamed through the optical fibers exits therefrom at those points. This emerging light reflects off the reflective backing and illuminates a diffusing front layer. In accordance with the patent's teachings, the fibers preferably have a center-to-center spacing equal to at least twice the fiber diameter, in order to provide a relatively unobstructed path from the reflective backing to the surface being illuminated.

Backlighting panels have been commercially produced in which individual fibers in a closely packed parallel array provide a illumination pattern of regularly spaced points of illumination. In one known backlighting panel, the fibers are not completely terminated but are only provided with a hole or slot that has a lateral extent less than or equal to the fiber diameter and which is typically offset to some extent relative to the fiber axis as a result of production tolerances. Furthermore, in order to guarantee that the majority of fibers providing light to a downstream region will be free from any upstream discontinuities, the lateral spacing of the terminations is typically about 150% of the center-to-center spacing of the fibers As a result, many of the terminations are not complete and a significant portion of the light beamed into the fiber (perhaps 30%) does not exit at a designated termination point Moreover, even if a fiber is provided with a hole which extends across the entire fiber diameter, a significant portion (perhaps 20%) of the light exiting the hole from the upstream portion of fiber will travel in a forward direction across the hole until it reenters the downstream portion of the fiber on the other side of the termination. Accordingly, a backlighting panel manufactured in accordance with such a prior art process will provide a somewhat uniform distribution of light, but is relatively inefficient. In another commercially available backlighting panel, individual fibers in a closely packed parallel array are each provided with a single termination at which the light may exit, using a programmed laser to cut across the entire array in a series of oblique angles forming a zig-zag pattern. Such a technique makes more efficient use of the light, but the illumination is less uniform with relatively large dark areas between two adjacent diverging cuts. This lack of uniformity can be alleviated by means of a diffuser between the backlighting panel and the device being illuminated, but at the cost of additional bulk and expense.

A need thus exists for an improved fiber optic backlighting panel and a method for making such fiber optic panels, whereby a predetermined pattern of background illumination may be produced by a compact and efficient device that is easy to manufacture.

SUMMARY OF THE INVENTION

In accordance with one important aspect of the invention, an improved fiber optic panel having a desired illumination pattern is assembled from at least two partial panels, each comprising a plurality of fully terminated parallel fibers. In accordance with this aspect of the present invention, two or more such partial arrays are combined to fabricate a optical fiber substrate having an arbitrary illumination pattern in which a fully terminated shorter fiber is located in the immediate vicinity of a fully terminated longer fiber.

In the preferred embodiment, the fibers in each partial array have a predetermined spacing between centers preferably equal to at least twice the diameter of a single fiber and the terminations of each partial array define a periodic ramp-like configuration of monotonically increasing lengths, which when intermeshed with a similar configuration offset longitudinally by half the length difference and laterally by half the width of each ramp-like pattern, provides a uniform illumination pattern resembling a regular mosaic of slightly tilted diamonds. In such an embodiment, the partial panels may be identical to one another, and are merely offset laterally and/or longitudinally from one another to provide a more uniform illumination pattern than would be possible with a single array of closely spaced fibers cut in a simple zig-zag pattern. The partial panels may be formed by winding a single length of fiber on a drum with a predetermined center-to-center spacing equal to at least twice the width of a single fiber, and adhesive tape is applied to the fiber to maintain said spacing prior to cutting the fiber and the tape in a direction perpendicular to the length of the fiber to create a parallel array of fibers having the desired spacing, which may then be cut into two identical halves each terminated in a complementary saw-tooth pattern. By providing the winding drum and the assembly fixture with indexing pins which cooperate with indexing holes in the supporting tape, the two partial panels may be offset by a predetermined offset when the fibers of the two partial panels are intermeshed.

In accordance with another important aspect of the present invention, the non-illuminated fiber lengths extending from the individual fiber terminations are removed before the two partial arrays are assembled, thus further enhancing the efficiency of the device by preventing light from reentering the fiber.

Although a fiber optic panel constructed in accordance with the invention preferably consists of a closely packed parallel array of optical fibers having varying lengths whose respective end points define a staggered mosaic of diamond-like illumination patterns, it should be understood that the invention in its broader aspects is applicable to any fiber optic substrate formed from two or more partial arrays of loosely spaced fibers, whereby the individual fibers of each partial array may be completely terminated in an arbitrary termination pattern without any possibility of producing unwanted nicks or discontinuities in adjacent fibers.

BRIEF DESCRIPTION OF THE DRAWINGS

Other aspects of the invention and its underlying objects will become apparent from the following detailed description of a preferred embodiment and the appended drawings, in which:

FIG. I shows a staggered mosaic of diamond-like illumination patterns;

FIG. 2 shows a first partial array of optical fibers for producing the illumination patterns of FIG. 1;

FIG. 3 shows a second partial array of optical fibers for producing the illumination patterns of FIG. 1;

FIG. 4 shows an assembled array of optical fibers constructed in accordance with the present invention from the partial arrays of FIGS. 2 and 3;

DETAILED DESCRIPTION OF THE PREFERRED EMBODIMENT

Figure 5:
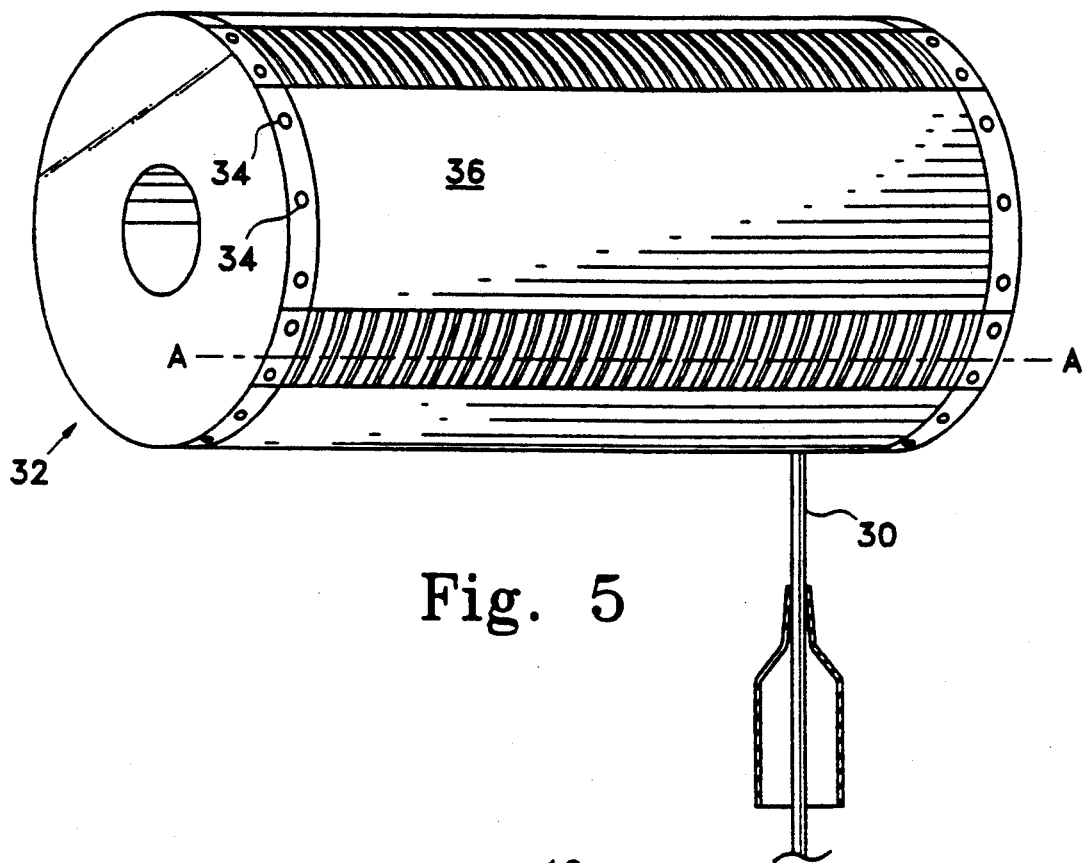
FIG. 5 shows how a winding drum may be used to produce a loosely spaced arrays of fibers.

FIG. 1 shows an relatively uniform termination configuration for a fiber optic illumination panel, in which each fiber (not shown) has a fully terminated end 12 and four adjacent such terminations 12a, 12b 12c and 12d define a diamond-like array 14 providing a point of illumination on its left (12a), on its right (12c), on its top (12b) and on its bottom (12d).

In the example illustrated there are 12 rows and 48 columns defining a total of 48 termination points 12 with only one termination per column, but four terminations per row. However, it should be understood that the principles of the invention can be readily extended to larger arrays. In that regard, if the lateral distance between fibers in an array of fibers having a length of the array in the direction of the fibers of L and a nominal fiber diameter d, is 1.1(d), then the vertical spacing S between rows is preferably calculated according to the equation $S \approx \sqrt{L \times 1.1(d)}$, to provide approximately the same distribution of the termination points both laterally and longitudinally. If n represents the number of partial arrays, the increment in length between adjacent fibers in the same ramp portion 20 of the same partial array 16, 22 (FIGS. 2, 3) is therefore given by the formula $n \times \sqrt{L} \times n.n(d)$.

To produce the array of FIG. 1, two partial arrays must be fabricated, as shown symbolically in FIGS. 2, 3 and 4.

FIG. 2 shows the first partial array 16, whose termination points 12 are associated only with odd numbered columns. Each column consists of a length of optical fiber 18 having a free end (not shown) leading to a light source and a termination end. It will be noted that the terminations 12 of the first partial array form a series of ramp-like sections 20, each consisting of six lengths of fiber 18 whose lengths increase monotonically. Since the terminations of each ramp section 20 lie in a common plane, all the terminations in one ramp section may be readily formed with a single slanting cut, preferably with a computer-controlled laser. It should also be noted that since the fibers in each partial array 16, 22 are not spaced tightly together, but are separated from each other by a distance equal to at least one fiber diameter, it is also possible to cut each individual fiber in at any arbitrary direction (including perpendicular to its length) without causing any discontinuity in any adjacent fiber. Thus, in accordance with an important aspect of the present invention, any termination process may be used that produces an arbitrary pattern of complete terminations in the individual fibers of a loosely spaced parallel array of fibers.

The second partial array 22 in FIG. 3 has the same ramp-like configuration of loosely spaced fibers as the first partial array 16 of FIG. 2, but the terminations 12' are offset relative to the corresponding terminations 12 of the first partial array I in the longitudinal direction (relative to the fiber 18) by one row and laterally by seven columns. Although the fibers 18' of the second partial array 22 are shaded differently in FIGS. 3 and 4 from the fibers 18 of the first partial array 16, it will be understood they are physically identical (except for length and position). It will be noted that each of the partial arrays 16, 22 is cut with a series of oblique angle cuts 12, 12' and that the cut ends of the two partial arrays 16, 22 are complementary to each other. Thus, as better shown in FIG. 6, the two partial arrays may be formed in a single cutting step from a single rectangular array.

As shown in FIG. 4, when the two partial arrays are overlaid to form a complete panel 24, their respective fibers lengths 18, 18' are intermeshed and their respective terminations 12, 12' form the desired diamond pattern 14.

The fabrication of each partial array will now be described with reference to FIGS. 5 and 6. A strand of fiber 30 is wound about a drum 32, which is provided with a series of registration pins 34 about its periphery. As previously noted, the winding mechanism is preferably set to provide a loose packing of approximately 2.2 fiber diameters center-to-center. After a helical coil of strand 30 has been formed on the surface of drum 32, adhesive tape 36 is used to hold the fiber sections 38 parallel to one another. When the helical coil of fiber 30 is slit parallel to the axis of drum 30 (line A—A) to form one or more rectangular arrays of parallel fibers (FIG. 6), the tape hold the individual strands of cut fibers 38 at the desired center-to-center spacing until the partial panels 16, 22 are assembled to form a complete array 24.

Figure 6:
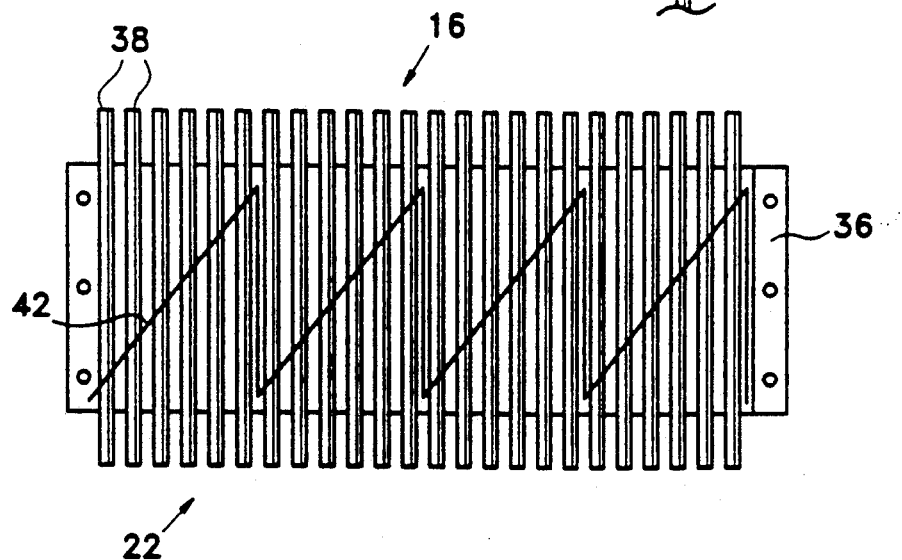
FIG. 6 shows how the two partial arrays of FIGS. 2 and 3 may be formed from a single loosely spaced array of FIG. 5.

As shown in FIG. 6, the individual terminations of each partial array 16, 22 are formed from the rectangular array by a series of straight cuts 42, using a conventional programmed laser cutter which cuts through both the fiber sections 38 and the supporting adhesive tape 36. Once the individual fibers 38 have been cut in the desired ramp pattern shown in FIGS. 2 and 3, the two partial arrays 16, 22 are separated, thereby removing the tail portions of the fiber sections extending beyond the termination and preventing light reentering the fiber after it has exited. It has been found experimentally that this can increase the efficiency of the panel by as much as 20%.

By use of an assembly fixture (not shown) having two set of registration pins offset from each other by the longitudinal and lateral offset previously discussed with reference to FIG. 4, two identical partial arrays may be superimposed to form the closely spaced array shown in FIG. 4. Since the two superimposed arrays 16, 22 are preferably intermeshed to form a completed array that is only one fiber thick, it is necessary to remove any transfer tape 36 on top of the first array 16 before the second array 22 is placed over it. To that end, a conventional reflective backing (not shown) with an exposed adhesive layer may be placed on the assembly fixture prior to placing the first partial array 16, which will serve to hold the fibers 18 of the first array in position after the transfer tape 36 is removed. Before removing the assembled array 24 from the fixture, heat and pressure are preferably applied to ensure that each length of fiber of each of the partial arrays is properly secured to the reflective backing.

It may be desirable to place a diffuser over the assembly in use, such as a thin piece of opaque plastic.

Although the invention has been described with particular reference to a presently preferred embodiment, it should be understood that its scope is not limited thereto, but only the appended claims. For example, an elliptical illumination pattern could be produced by two partial arrays whose respective terminations define opposing semi-ellipses.

What is claimed is:

1. A method of making a fiber optic panel having a predetermined illumination pattern, comprising the steps:
   forming at least two partial panels, each comprising:
      a loosely spaced array of parallel fibers with a predetermined spacing between centers; and
      a plurality of adjacent ramp sections, with the lengths of the fibers in each ramp section incremented by a predetermined increment $n \times \sqrt{L} \times n.n(d)$, in which L represents the length of the array in the direction of the fiber, d represents the nominal fiber diameter, and n represents the number of partial panels;
   completely terminating each of the fibers at a respective termination point by removing any tail portion of the fiber upstream from the termination point; and
   assembling the thus terminated fibers of the at least two partial panels into a complete panel with at least one fiber termination point of a first partial panel lying immediately adjacent the illuminated portions of two fibers of a second partial panel.

2. The method of claim 1, wherein said terminating step further comprises cutting a plurality of said fibers with a single straight cut.

3. The method of claim 1, wherein said at least two partial panels are identical to one another, and said assembling step further comprises:
   offsetting a first partial panel by predetermined offset from a second partial panel.

4. The method of claim 1, wherein said forming step further comprises:
   winding a single length of fiber on a drum with a center-to-center spacing equal to said predetermined spacing;
   applying adhesive tape to the fiber to maintain said spacing;
   cutting the fiber in a direction perpendicular to the length of the fiber to create a rectangular array of parallel fibers maintained in a predetermined spatial arrangement relative to one another by said tape; and
   cutting through the rectangular array of parallel fibers and the tape to thereby form two said partial panels of said fully terminated fibers.

5. A method of making a fiber optic panel having a predetermined illumination pattern, comprising the steps:
   forming at least two partial panels, each comprising a loosely spaced array of parallel fibers with a predetermined spacing between centers, said predetermined spacing is equal to at least twice the diameter of a single fiber;
   completely terminating each of the fibers at a respective termination point by removing any tail portion of the fiber upstream from the termination point; and
   assembling the thus terminated fibers of the at least two partial panels into a complete panel with at least one fiber termination point of a first partial panel lying immediately adjacent the illuminated portions of two fibers of a second partial panel, assembling step comprising the steps of:
      providing the first partial panel with a reflective adhesive support; and
      adhering the second partial panel to the reflective adhesive support with the fibers of the two partial panels intermeshed and with a fully terminated shorter fiber of the second partial panel between two fully terminated longer fibers or the first partial panel.

6. The method of claim 5, wherein said at least two partial panels are identical to one another and said assembling step further comprises:
   offsetting the first partial panel relative to the second partial panel by a predetermined offset equal to a plurality of widths of said fibers.

7. A fiber optic panel having a predetermined and uniform illumination pattern comprising a closely packed parallel array of fully terminated optical fibers of at least two different lengths in which a fully terminated shorter fiber is intermeshed between two long fibers wherein the array of optical fibers forms a pattern that resembles a regular mosaic of slightly tilted diamonds.

8. The method of claim 5, wherein said terminating step further comprises cutting a plurality of said fibers with a single straight cut.

9. The method of claim 5, wherein said at least two partial panels are identical to one another, and said assembling step further comprises:
   offsetting a first partial panel by predetermined offset from a second partial panel.

10. The method of claim 5, wherein said forming step further comprises:
   winding a single length of fiber on a drum with a center-to-center spacing equal to said predetermined spacing;
   applying adhesive tape to the fiber to maintain said spacing;
   cutting the fiber in a direction perpendicular to the length of the fiber to create a rectangular array of parallel fibers maintained in a predetermined spatial arrangement relative to one another by said tape; and
   cutting through the rectangular array of parallel fibers and the tape to thereby form two said partial panels of said fully terminated fibers.

* * * * *